United States Patent
Yao et al.

(10) Patent No.: US 7,684,157 B2
(45) Date of Patent: Mar. 23, 2010

(54) HEAD GIMBAL ASSEMBLY INCLUDING FIRST AND SECOND DIMPLES, AND DISK DRIVE UNIT INCLUDING THE SAME

(75) Inventors: MingGao Yao, DongGuan (CN); Masashi Shiraishi, HongKong (CN); YiRu Xie, DongGuan (CN)

(73) Assignee: SAE Magnetics (H. K.) Ltd., Hong Kong (CN)

( * ) Notice: Subject to any disclaimer, the term of this patent is extended or adjusted under 35 U.S.C. 154(b) by 693 days.

(21) Appl. No.: 11/319,580

(22) Filed: Dec. 29, 2005

(65) Prior Publication Data

US 2007/0153429 A1    Jul. 5, 2007

(51) Int. Cl.
G11B 5/56    (2006.01)

(52) U.S. Cl. .................................................... 360/294.4

(58) Field of Classification Search ........................ None
See application file for complete search history.

(56) References Cited

U.S. PATENT DOCUMENTS

| | | | |
|---|---|---|---|
| 5,299,081 A | | 3/1994 | Hatch et al. |
| 5,611,707 A | | 3/1997 | Meynier |
| 5,636,089 A | * | 6/1997 | Jurgenson et al. ........ 360/245.1 |
| 5,898,544 A | | 4/1999 | Krinke et al. |
| 6,078,470 A | * | 6/2000 | Danielson et al. ........ 360/245.1 |
| 6,198,606 B1 | | 3/2001 | Boutaghou et al. |
| 6,538,836 B1 | | 3/2003 | Dunfield et al. |
| 6,617,763 B2 | | 9/2003 | Mita et al. |
| 6,624,984 B2 | | 9/2003 | Lewis et al. |
| 6,671,131 B2 | | 12/2003 | Kasajima et al. |
| 6,700,727 B1 | | 3/2004 | Crane et al. |
| 6,700,749 B2 | | 3/2004 | Shiraishi et al. |
| 6,917,498 B2 | * | 7/2005 | Kuwajima et al. ........ 360/294.4 |
| 6,950,266 B1 | | 9/2005 | McCaslin et al. |
| 7,072,149 B2 | * | 7/2006 | Kuwajima et al. ........ 360/294.4 |
| 2003/0147177 A1 | | 8/2003 | Yao et al. |

(Continued)

FOREIGN PATENT DOCUMENTS

JP    2002-74871    3/2002

(Continued)

OTHER PUBLICATIONS

U.S. Appl. No. 11/238,998, filed Sep. 2005, Yang et al.

(Continued)

*Primary Examiner*—David D Davis
(74) *Attorney, Agent, or Firm*—Nixon & Vanderhye, PC

(57) ABSTRACT

A HGA of the present invention includes a slider; a micro-actuator comprising two thin film PZT pieces to define a notch; a suspension to load the slider and the micro-actuator. The suspension comprises: a flexure having an actuator loading portion with a slot corresponding to the notch of the micro-actuator, and a slider-loading portion to partially hold the slider; and a load beam having a first dimple to support the flexure at a position thereof corresponding to a central area of the slider, and a second dimple extending through both the slot of the flexure and the notch defined by the micro-actuator and toward an leading edge end portion of the slider to form a gap between the slider and the second dimple. The invention also discloses a disk drive unit having the improved HGA.

12 Claims, 8 Drawing Sheets

U.S. PATENT DOCUMENTS

| | | |
|---|---|---|
| 2003/0147181 A1 | 8/2003 | Shiraishi et al. |
| 2003/0168935 A1 | 9/2003 | Ogawa et al. |
| 2006/0023338 A1 | 2/2006 | Sharma et al. |
| 2006/0050442 A1 | 3/2006 | Yao et al. |
| 2006/0072247 A1 | 4/2006 | Yao et al. |
| 2006/0082917 A1 | 4/2006 | Yao et al. |
| 2006/0098347 A1 | 5/2006 | Yao et al. |
| 2006/0146449 A1 | 7/2006 | Yao et al. |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823, filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/273,075, filed Nov. 2005, Yao.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

HEAD GIMBAL ASSEMBLY INCLUDING FIRST AND SECOND DIMPLES, AND DISK DRIVE UNIT INCLUDING THE SAME

FIELD OF THE INVENTION

The present invention relates to disk drive units, and more particularly to a head gimbal assembly (HGA) having a structure to protect micro-actuator mounted therein.

BACKGROUND OF THE INVENTION

A disk drive stores and retrieves data by positioning a magnetic read/write head over a rotating magnetic media, such as magnetic disk. Referring to FIGS. 1a and 1b, a typical disk drive in related art has a drive arm 105 to drive a HGA 104 with a slider 202 mounted thereon, and a magnetic disk 106. The disk 106 is mounted on a spindle motor 103 which causes the disk 106 to spin and a voice-coil motor (VCM) 102 is provided for controlling the motion of the drive arm 105 to drive the HGA 104 so as to control the slider 202 which having a read/write transducer to move from track to track across the surface of the disk 106 to read data from or write data to the disk 106.

However, Because of the inherent tolerance resulting from VCM 102 that exists in the displacement of the slider 202, the slider 202 can not attain a fine position adjustment.

To solve the above-mentioned problem, piezoelectric (PZT) micro-actuators are now utilized to modify the displacement of the slider. That is, the PZT micro-actuator corrects the displacement of the slider on a much smaller scale to compensate for the tolerance of VCM and the manufacture tolerance of the component of the drive arm. It enables a smaller recording track width, increases the 'tracks per inch' (TPI) value by 50% of the disk drive unit (also increases the surface recording density).

Referring to FIGS. 2a and 2b, a conventional HGA 200 includes a suspension 208, a slider 202 with a read/write transducer (not shown) fixed to a tip end of the suspension 208, and a micro-actuator 204 attached to the suspension 208 for fine tuning the displacement of the slider 202. The suspension 208 has a base plate 219, a flexure 206, a load beam 215, and a hinge 213 which are assembled together. Referring to FIGS. 2a, 2b and 2c, the flexure 206 comprises a flexure body 261, a slider holding plate 212, and a wire holding plate 213 to support the flexure body 261. The flexure 206 has a slider-loading portion 211 to partially hold the slider 202 and thus exposing the leading edge end portion 272 of the slider 202 to the micro-actuator 204; and the load beam 215 having a dimple 218 to support the flexure 206 at a position thereof corresponding to a central area of the slider 202. However, when a shock or vibration happens to the HGA 200 or a disk drive having the HGA 200, the slider 202 will rotate with the dimple 218 as a rotation center in a direction 220 toward the micro-actuator 204 and there is a tendency that its leading edge end portion 272 will hit a top surface of the micro-actuator 204 so as to damage the micro-actuator 204.

Referring to FIG. 2b, the micro-actuator 204 is electrically connected with the flexure 206 by wire-bonding method. However, the wire-bonding method is easy to form wire-bonding bumps which badly influence the electrical connection between the micro-actuator 204 and the flexure 206. In addition, the wire-bonding method is very difficult to operate and has a high cost. In addition, there is a difficulty to accurately mount the micro-actuator onto the suspension of the HGA because there is no any mounting datum structure.

Hence, it is desired to provide a HGA and a disk drive unit which can overcome the above-mentioned shortcomings.

SUMMARY OF THE INVENTION

A main feature of the present invention is to provide a HGA and a disk drive unit which can prevent the slider from hitting a micro-actuator mounted in the HGA and improve shock performance thereof.

Another feature of the present invention is to provide a HGA and a disk drive unit which can greatly reduce the manufacturing cost of the HGA and improve the electrical connection reliability of the HGA.

A further feature of the present invention is to provide a HGA and disk drive unit which can greatly improve the assembly accuracy of the HGA.

To attain the above features, a HGA of the present invention comprises a slider; a micro-actuator comprising two thin film PZT pieces to define a notch; a suspension to load the slider and the micro-actuator. The suspension comprises a flexure having an actuator loading portion with a slot corresponding to the notch of the micro-actuator, and a slider-loading portion to partially hold the slider; and a load beam having a first dimple to support the flexure at a position thereof corresponding to a central area of the slider, and a second dimple extending through both the slot of the flexure and the notch defined by the micro-actuator and toward an leading edge end portion of the slider to form a gap between the slider and the second dimple.

In an embodiment of the invention, the gap between the slider and the second dimple has a distance ranged from 20 µm to 60 µm. The second dimple has a soft top portion for absorbing shocking or vibration. In another embodiment of the present invention, an actuator mounting datum hole is formed in the notch of the micro-actuator at a position corresponding to the second dimple; and a flexure mounting datum hole is formed in the slot of the flexure corresponding to the second dimple; the second dimple extends through the flexure mounting datum hole and the actuator mounting datum hole in sequence when assembling the micro-actuator, the flexure and the load beam together so as to ensure a high assembly precision. In an embodiment of the invention, the thin film PZT pieces are coupled to the flexure with anisotropic conductive film. Each of the thin film PZT pieces comprises an electric layer, an insulated layer, and a PZT layer sandwiched between the electric layer and the insulated layer; the micro-actuator is mounted on the flexure with the electric layer facing to the flexure.

A disk drive unit of the present invention comprises a HGA; a drive arm to connect with the HGA; a disk; and a spindle motor to spin the disk; wherein the HGA comprises a slider; a micro-actuator comprising two thin film PZT pieces to define a notch; a suspension to load the slider and the micro-actuator; wherein the suspension comprises: a flexure having an actuator loading portion with a slot corresponding to the notch of the micro-actuator, and a slider-loading portion to partially hold the slider; and a load beam having a first dimple to support the flexure at a position thereof corresponding to a central area of the slider, and a second dimple extending through both the slot of the flexure and the notch defined by the micro-actuator and toward an leading edge end portion of the slider to form a gap between the slider and the second dimple.

In the invention, because there is the second dimple provided on the load beam which is more adjacent to the slider than the micro-actuator and serves as a limiter to prevent the slider from movement, such as rotation so that the micro-actuator can be protected from a hit of the slider and thus avoiding being damaged. Also, a shock performance of the HGA and the disk drive with the HGA can be improved because the additional dimple can limit the slider unduly movement. In addition, the HGA of the present invention utilizes the ACF piece to physically and electrically connect the micro-actuator 304 with the flexure 306 instead of wire bonding method so as to attain a good connection reliability and have no concern on the wire bonding bump issue. Also, the ACF bonding method is a cheaper bonding method and easy to operate. Furthermore, because the thin film PZT piece of the micro-actuator has the insulated layer facing to the slider so as to protect the PZT layer from being damage even if a hit of the slider is applied to the micro-actuator when a shock or vibration happens.

For the purpose of making the invention easier to understand, several particular embodiments thereof will now be described with reference to the appended drawings in which:

DETAILED DESCRIPTION OF THE INVENTION

Figure 1A:
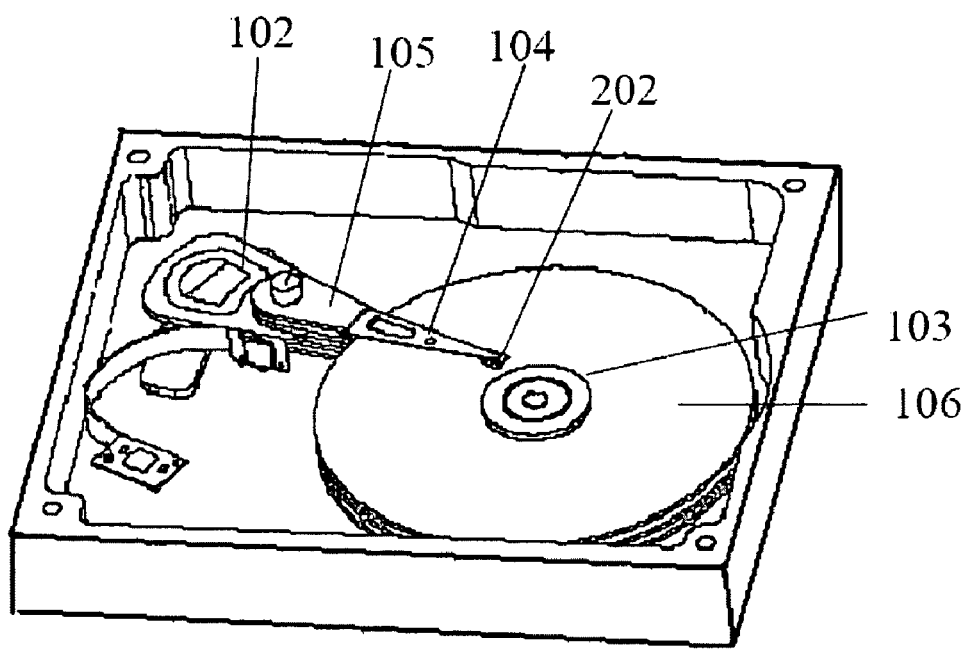
FIG. 1*a* is a perspective view of a traditional disk drive.
Figure 1B:
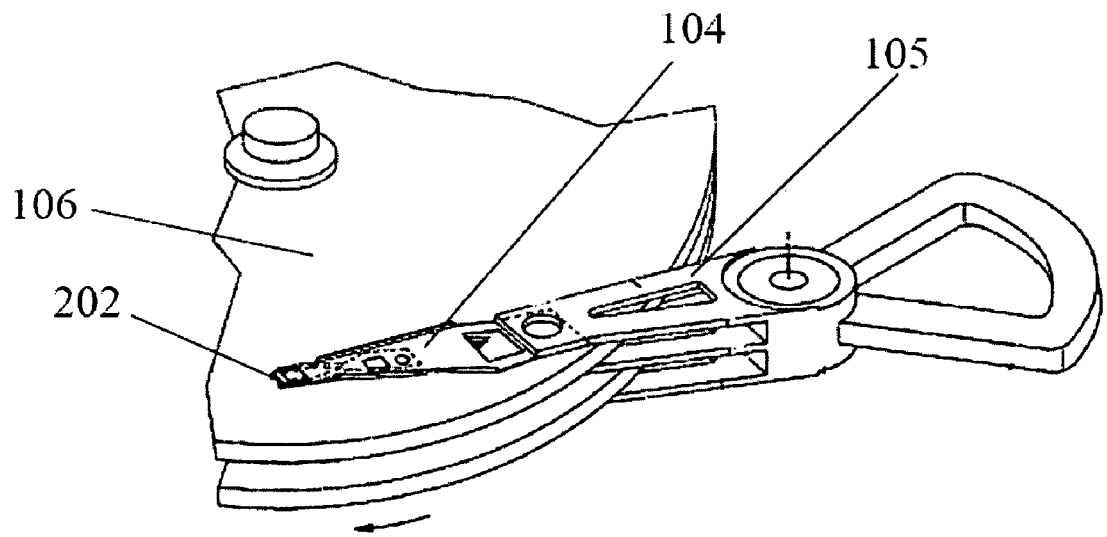
FIG. 1*b* is an enlarged, partial view of FIG. 1*a*.
Figure 2A:
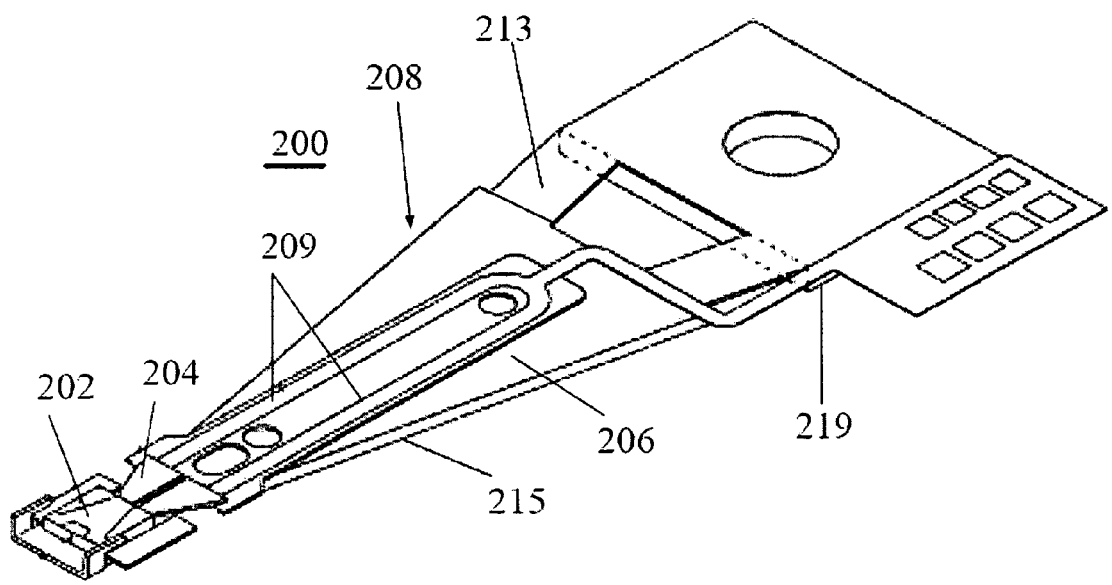
FIG. 2*a* is a perspective view of a HGA of related art.
Figure 2B:
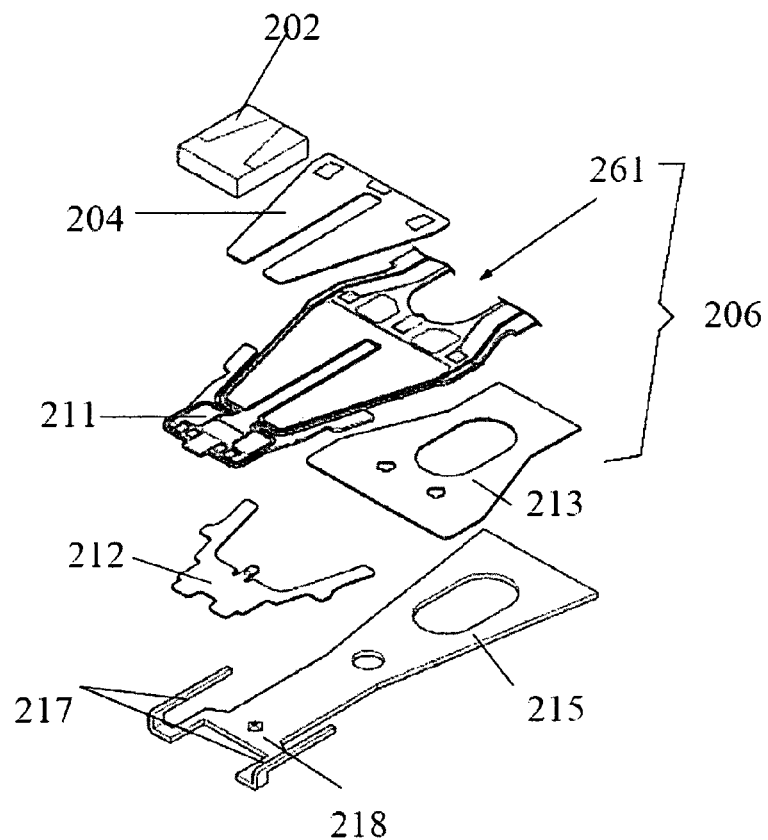
FIG. 2*b* is a partial, exploded, perspective view of the HGA shown in FIG. 2*a*.
Figure 2C:
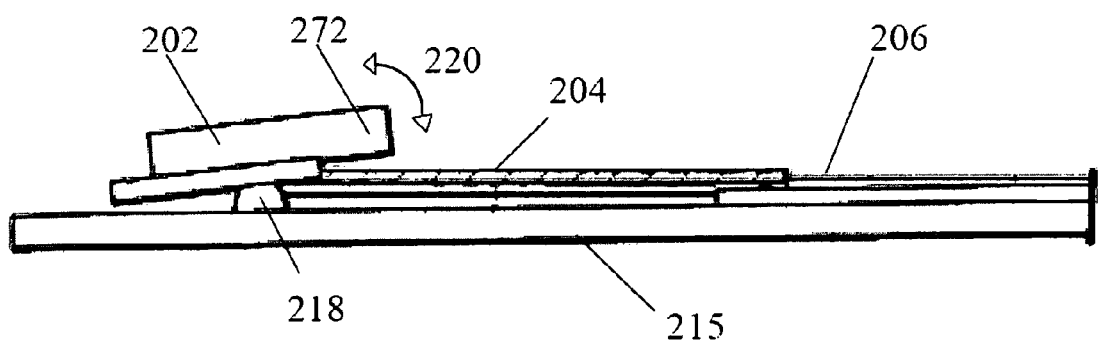
FIG. 2*c* is a cross-sectional view of the HGA shown in FIG. 2*a*.

Various preferred embodiments of the instant invention will now be described with reference to the figures, wherein like reference numerals designate similar parts throughout the various views. As indicated above, the instant invention is designed to a head gimbal assembly (HGA) having a micro-actuator protecting structure for preventing the micro-actuator, such as thin film PZT micro-actuator from being damaged or destroyed when a disk drive having the HGA is shocked or vibrated. Specifically, the present invention is to provide an additional dimple on a load beam of a suspension of the HGA to extend through both a flexure of the suspension and the micro-actuator and toward an leading edge end portion of a slider of the HGA to form a gap between the slider and the second dimple. In the invention, the flexure has a slider-loading portion to partially hold the slider and thus exposing the leading edge end portion of the slider to the micro-actuator; and the load beam having a first dimple to support the flexure at a position thereof corresponding to a central area of the slider, when a shock or vibration happens to the HGA or a disk drive having the HGA, the slider will rotate with the first dimple as a rotation center and there is a tendency that its leading edge end portion will hit a top surface of the micro-actuator and even damage the micro-actuator. Understandably, the additional dimple is more adjacent to the slider than the micro-actuator and serves as a limiter to prevent the slider from movement, such as rotation so that the micro-actuator can be protected from a hit of the slider and thus avoiding being damaged. Also, a shock performance of the HGA and the disk drive with the HGA can be improved because the additional dimple can limit the slider unduly movement.

Figure 3A:
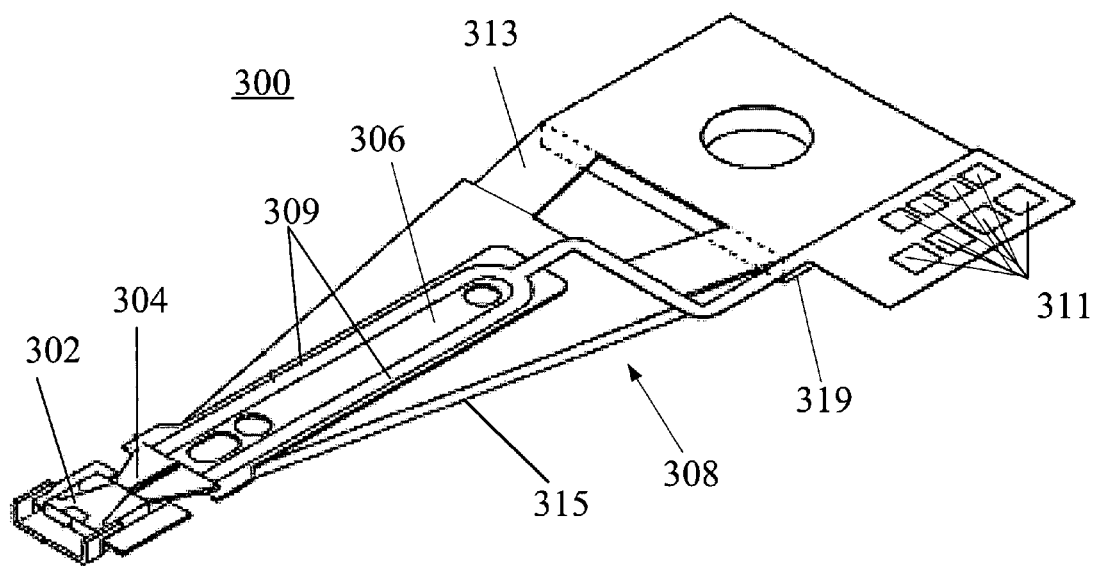
FIG. 3*a* is a perspective view of a HGA according to an embodiment of the present invention.
Figure 4A:
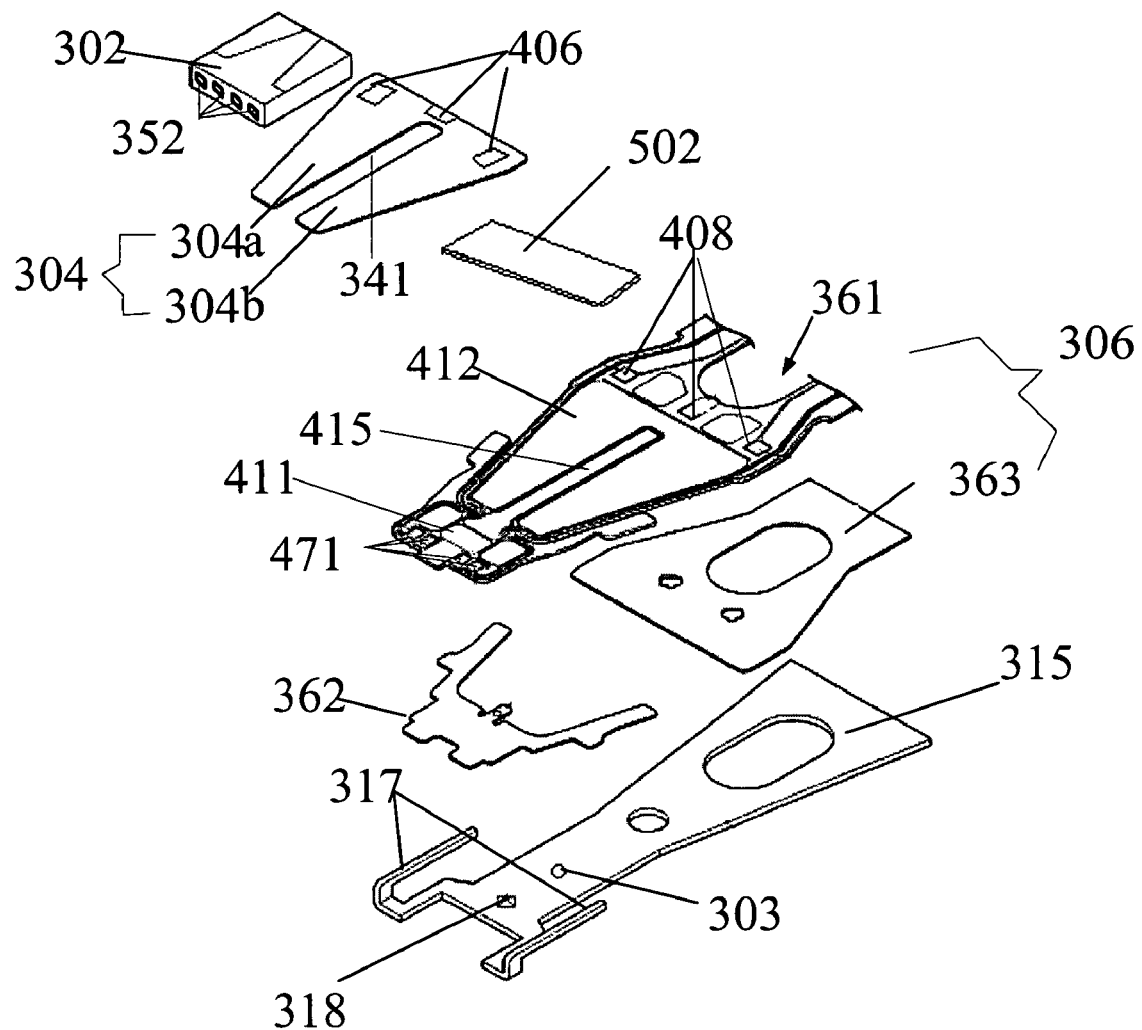
FIG. 4*a* is an exploded, perspective view of the HGA shown in FIG. 3*a*.

Several example embodiments of a HGA of the invention will now be described. Referring to FIGS. 3*a* and 4*a*, a HGA 300 according to an embodiment of the present invention comprises a slider 302, a micro-actuator 304, and a suspension 308 to load the slider 302 and the micro-actuator 304. The slider 302 comprises a read\write transducer (not shown) embedded therein during fabrication and a plurality of slider bonding pads 352 on its trailing edge. The suspension 308 comprises a base plate 319, a hinge 313, a flexure 306 and a load beam 315 which are assembled together. In addition, a plurality of multi-traces 309 is arrayed in the flexure 306 which are electrically connected with the micro-actuator 304 at one end thereof and a plurality of electrical pads 311 at the other end thereof. In the present invention, the electrical pads 311 are connected with a control system (not shown) so that control signals generating from the control system can be input into the micro-actuator 304 through the electric pads 311 to control the micro-actuator 304. Also, the multi-traces 309 are electrically connected with the slider 302, this enables the slider 302 to be controlled by the control system through the electrical pads 311.

Referring to FIG. 4*a*, the flexure 306 comprises a flexure body 361, a slider holding plate 362, and a wire holding plate 363. The flexure 306 has an actuator loading portion 412 with a slot 415 defined in a middle area of the actuator loading portion 412, and a slider-loading portion 411 on one end thereof to partially hold the slider 302. A plurality of electrical pads 408 are provided on an area of the flexure 306 adjacent to the actuator loading portion 412. Also, there is a plurality of electrical pads 471 on the flexure 306 corresponding to the slider bonding pads 352 of the slider 302. In an embodiment, the slider holding plate 362 and the wire holding plate 363 are mounted on a back side of the flexure body 361 for supporting the flexure body 361 and improving the stiffness of the flexure 306. In another embodiment of the invention, the slider holding plate 362 and the wire holding plate 363 may be formed by partially etching the flexure 306 during the manufacturing process of the flexure 306.

Also referring to FIG. 4*a*, the micro-actuator 304 comprises two PZT pieces 304*a*, 304*b*, each of which has a three-layer structure, i.e., an electric layer 402, an insulated layer 404 and a PZT layer 403 sandwiched between the electric layer 402 and insulated layer 404. The two PZT pieces 304*a*, 304*b* are bonded together only in one end thereof so as to define a notch 341 between the two PZT pieces 304*a*, 304*b*, which have a plurality of electrical pad 406 formed on a same side thereof corresponding to the electrical pad 408 of the flexure 306. In the invention, the notch 314 is formed corresponding to the slot 415 of the flexure 306.

Referring to FIG. 4*a*, the load beam 315 comprises two limiters 317 extending from two sides of one end thereof, which is used for limiting the flexure 306 excessively bending against the load beam 315. In addition, referring to FIGS. 3*b*, 4*a* and 4*b*, the load beam 315 has a first dimple 318 to support the flexure 306 at a position thereof corresponding to a central area of the slider 302 so as to keep the load force always being applied to the center area of the slider 302 through the first dimple 318 when the slider 302 flies on the surface of a disk (not shown). Especially, the load beam 315 further comprises an additional or second dimple 303 adjacent to the first dimple 318. When the HGA 300 is assembled, the second dimple 303 extends through both the slot 415 of the flexure 306 and the notch 341 defined by the micro-actuator 304 and toward a leading edge end portion 321 of the slider 302 so as to form a gap 500 between the slider 302 and the second dimple 303. The gap 500 is provided to ensure the second dimple 303 not to affect the flying performance of the slider 202 above the surface of a disk (not shown). In addition, the gap 500 also serves as a buffer space so as to buffer a hit of the slider 302 to the second dimple 303 when the slider 302 rotates toward the micro-actuator 304 due to an exoteric shock or vibration. In a preferred embodiment of the invention, the gap 500 has a distance ranged from 20 μm to 60 μm.

In an embodiment of the invention, the second dimple 303 may have a soft top portion (not labeled) for absorbing shocking or vibration. In the invention, the second dimple 303 may have any suitable shape for extending through both the slot 415 of the flexure 306 and the notch 341 defined by the micro-actuator 304, such as dome-shape or pin-shape, which can be made of any suitable soft material, such as polymer so as to attain a good buffer function.

In the invention, referring to FIGS. 4a, 4c and 4d, the micro-actuator 304 is assembled to the flexure 306 as follows: firstly, positioning an anisotropic conductive film (ACF) piece 502 onto the flexure 306 to cover the electric pads 408 of the flexure 306. Then, positioning the micro-actuator 304 onto the flexure 306, and aligning the electrical pads 406 of the micro-actuator 304 with the electrical pads 408 of the flexure 306 correspondingly while aligning the notch 341 of the micro-actuator 304 with the slot 415 of the flexure 306. Thus the ACF piece 502 is sandwiched between the micro-actuator 304 and the flexure 306 so as to physically connecting the micro-actuator 304 with the flexure 306. In addition, the electric pads 408 of the flexure 306 are electrically coupled with the electric pads 406 of the micro-actuator 304 by the ACF piece 502 so as to electrically connecting the micro-actuator 304 with the flexure 306. Different from conventional wire bonding method, the HGA of the present invention utilizes the ACF piece to physically and electrically connect the micro-actuator 304 with the flexure 306 so as to attain a good connection reliability and have no concern on the wire bonding bump issue. Also, the ACF bonding method is a cheaper bonding method and easy to operate.

Figure 4B:
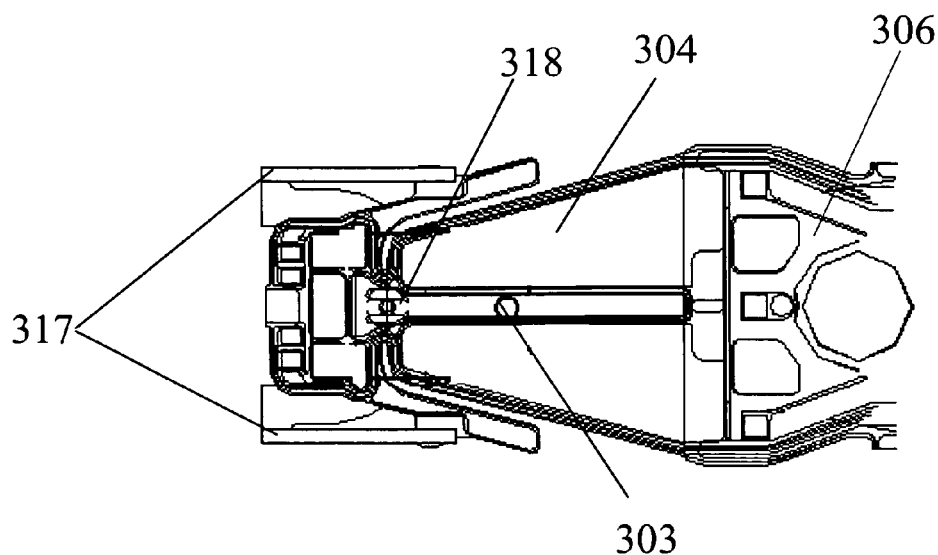
FIG. 4*b* is a top plan view of the HGA in FIG. 3*a* removing its slider.
Figure 4C:
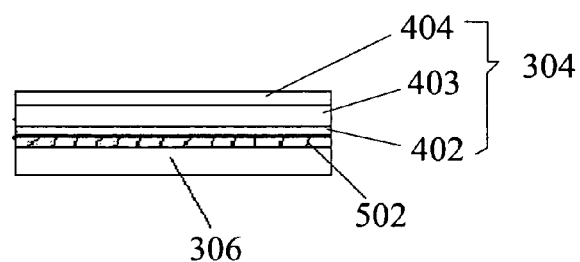
FIG. 4*c* shows a connection relationship between a micro-actuator and a flexure of the HGA in FIG. 3*a*, it also shows a structure of a thin film PZT piece of the micro-actuator.
Figure 4D:
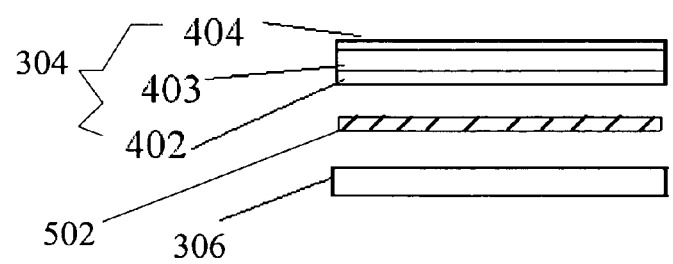
FIG. 4*d* is an exploded view of FIG. 3*c*.

Specifically, referring to FIGS. 4c and 4d, each of the two PZT pieces 304a, 304b has its electric layer 402 face to and electrically connect with the flexure 306. Thus, the insulated layer 404 thereof may face to the slider 302 (see FIG. 4a) so as to protect the PZT layer 403 from damage even on a condition that without the second dimple 303 on the HGA 300. That is, when a shock or vibration happens, the slider will rotate towards the micro-actuator 304 and only hit a top surface (the insulated layer 404) of the thin film PZT piece 304a and/or 304b, but not damage the PZT layer 403, this kind of hit to the micro-actuator 304 may have little influence on the physical and electric characteristics of the micro-actuator 304.

Figure 3B:
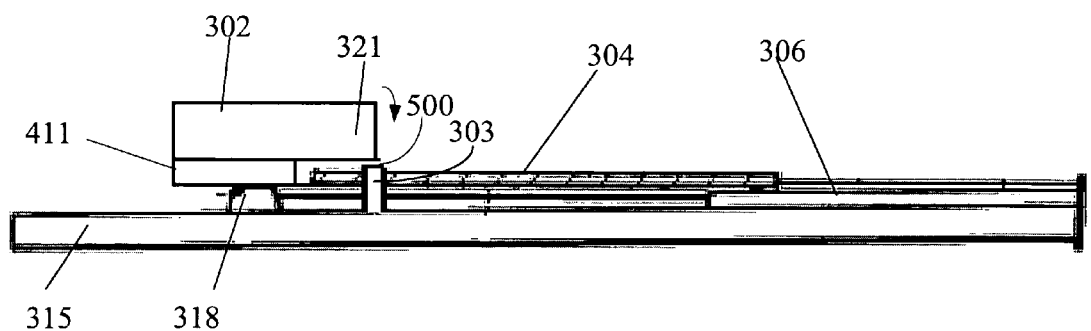
FIG. 3*b* is a cross-sectional view of the HGA in FIG. 3*a*.

In the present invention, referring to FIGS. 3a and 4a and 3b, the slider 302 is partially mounted on the slider loading portion 411 of the flexure 306 by using such as adhesive or epoxy. A plurality of metal balls (gold ball bonding or solder ball bonding, GBB or SBB, not shown) is used to electrically connect the electrical pads 471 on the flexure 306 with the slider bonding pads 352 of the slider 302 so as to connect the slider 302 with the control system through the multi-traces 309 as aforementioned. According to an embodiment of the invention, referring to FIG. 3a, the load beam 315, the flexure 306, the base plate 319 and the hinge 313 are assembled together by a traditional assembly method, such as laser welding to form the suspension 308. After that, the slider 302 and the micro-actuator 304 are assembled on the suspension 308 to form the HGA 300.

In the present invention, the second dimple 303 is higher than the top surface of the micro-actuator 304, but lower than the bottom surface of the slider 302 so that the second dimple 303 may prevent the slider 302 from hitting the micro-actuator 304 and thus avoid the damage of the micro-actuator when a shock or vibration happens to cause a rotation movement of the slider 302 toward the micro-actuator 304.

Figure 5A:
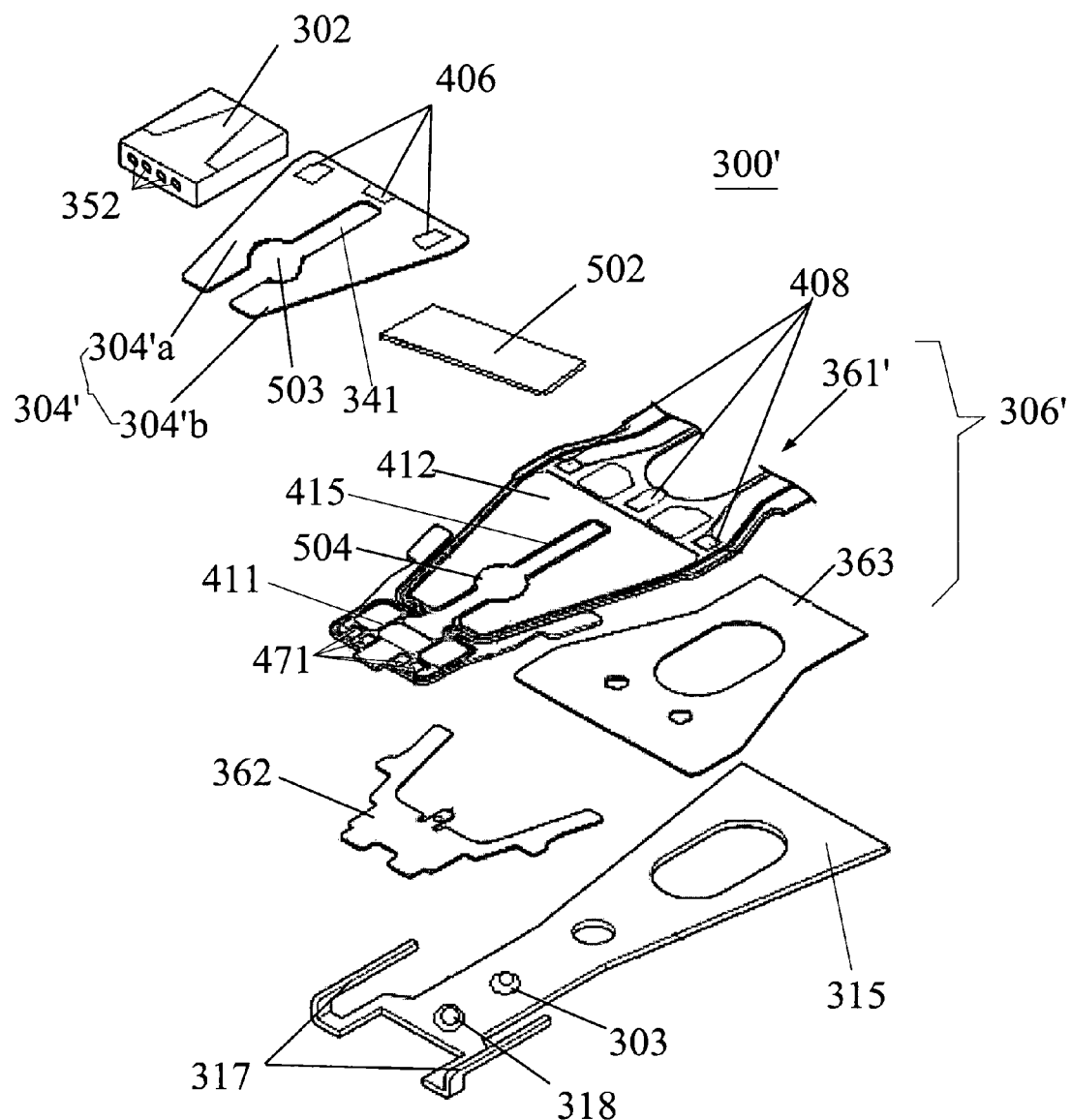
FIG. 5*a* is an exploded, perspective view of a HGA according to another embodiment of the present invention.
Figure 5B:
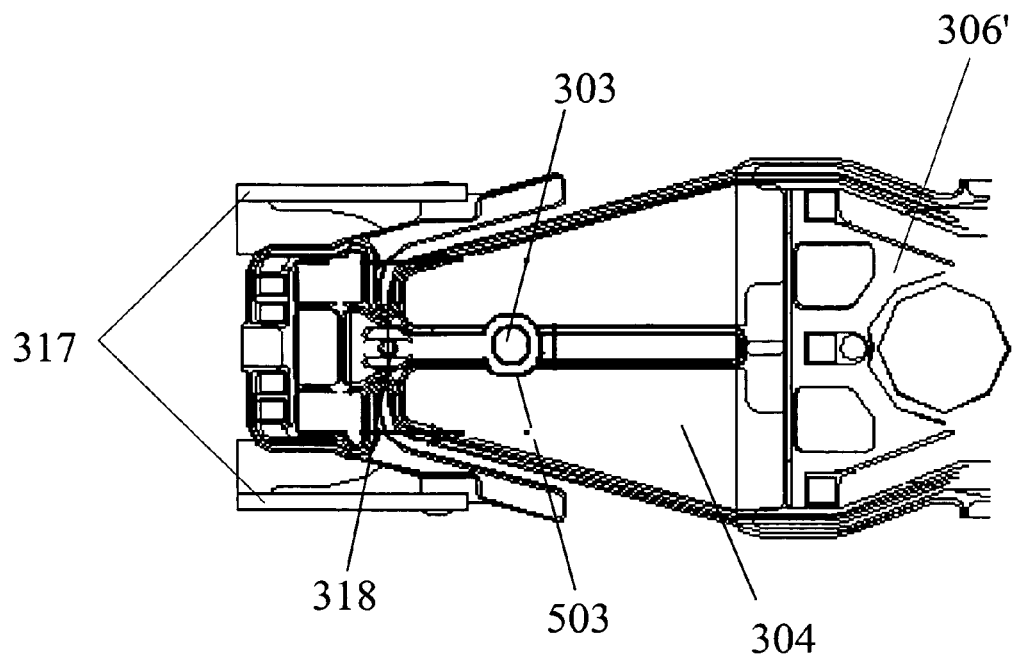
FIG. 5*b* is a top plan view of the HGA shown in FIG. 5*a* removing its slider.

Referring to FIGS. 5a and 5b, a HGA 300' according to another embodiment of the present invention is illustrated herein. The HGA 300' is similar to the HGA 300 except that there are some different about the micro-actuator and the flexure. That is, the HGA 300' comprises a micro-actuator 304' formed by two thin film PZT piece 304'a and 304'b each of which has a semi-circular hole (not labeled) formed on their inner side so as to form a circular datum hole 503 in a middle area of the notch 341 of the micro-actuator 304' corresponding to the second dimple 303 on the load beam 315. Also, the HGA 300' comprises a flexure 306' which has a flexure body 361', a slider holding plate 362, and a wire holding plate 363. A circular datum hole 504 is formed in the slot 415 of the flexure 306' corresponding to the second dimple 303 and the circular datum hole 503. The second dimple 303 may extend through the circular datum holes 503 and 504 in sequence when assembling the micro-actuator, the flexure and the load beam together so as to ensure a high assembly precision of the HGA 300'.

Understandably, the HGA of the present invention is not limited to the structures illustrated in the aforementioned embodiments. Any HGA having a suitable flexure and load beam can be used in the invention.

Figure 6:
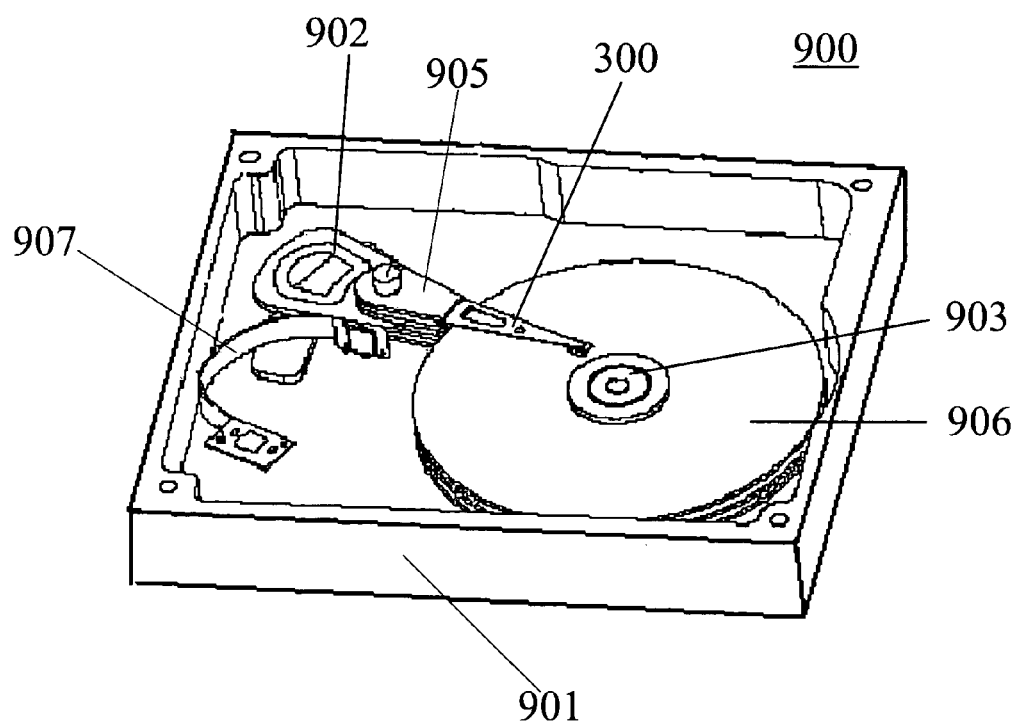
FIG. 6 is a perspective view of a disk drive unit according to an embodiment of the present invention.

FIG. 6 shows an exemplary disk drive unit incorporating the HGA of the present invention. According to an embodiment of the present invention, the disk drive unit 900 comprises a housing 901, a disk 906, a spindle motor 903, a flex printed circuit 907, a VCM 902, a drive arm 905, and the HGA 300 constructed in accordance with the present invention having a structure to protect the micro-actuator in the HGA 300 and improve the shock performance of the disk drive unit 900. Because the structure and/or assembly process of a hard disk drive by using the HGA of the present invention is well known to persons ordinarily skilled in the art, a detailed description of such structure and assembly is omitted herefrom. Understandably, the disk drive unit may incorporate with other embodiments of the HGA constructed in accordance with the present invention.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:
1. A head gimbal assembly, comprising
a slider;
a micro-actuator comprising two thin film PZT pieces to define a notch;
a suspension to load the slider and the micro-actuator; wherein the suspension comprises:

a flexure having an actuator loading portion with a slot corresponding to the notch of the micro-actuator, and a slider-loading portion to partially hold the slider; and a load beam having a first dimple to support the flexure at a position thereof corresponding to a central area of the slider, and a second dimple extending through both the slot of the flexure and the notch defined by the micro-actuator and toward a leading edge end portion of the slider to form a gap between the slider and the second dimple.

2. The head gimbal assembly as claimed in claim 1, wherein the gap between the slider and the second dimple has a distance ranging from 20 µm to 60 µm.

3. The head gimbal assembly as claimed in claim 1, wherein the second dimple has a soft top portion for absorbing shocking or vibration.

4. The head gimbal assembly as claimed in claim 1, wherein an actuator mounting datum hole is formed in the notch of the micro-actuator at a position corresponding to the second dimple; and a flexure mounting datum hole is formed in the slot of the flexure corresponding to the second dimple; the second dimple extends through the flexure mounting datum hole and the actuator mounting datum hole in sequence when assembling the micro-actuator, the flexure and the load beam together so as to ensure a high assembly precision.

5. The head gimbal assembly as claimed in claim 1, wherein the thin film PZT pieces are coupled to the flexure with anisotropic conductive film.

6. The head gimbal assembly as claimed in claim 1, wherein each of the thin film PZT pieces comprises an electric layer, an insulated layer, and a PZT layer sandwiched between the electric layer and the insulated layer; the micro-actuator is mounted on the flexure with the electric layer facing to the flexure.

7. A disk drive unit comprising:
a head gimbal assembly;
a drive arm to connect with the head gimbal assembly;
a disk; and
a spindle motor to spin the disk; wherein the head gimbal assembly comprises a slider;
a micro-actuator comprising two thin film PZT pieces to define a notch;
a suspension to load the slider and the micro-actuator; wherein the suspension comprises:
a flexure having an actuator loading portion with a slot corresponding to the notch of the micro-actuator, and a slider-loading portion to partially hold the slider; and
a load beam having a first dimple to support the flexure at a position thereof corresponding to a central area of the slider, and a second dimple extending through both the slot of the flexure and the notch defined by the micro-actuator and toward a leading edge end portion of the slider to form a gap between the slider and the second dimple.

8. The disk drive unit as claimed in claim 7, wherein the gap between the slider and the second dimple has a distance ranging from 20 µm to 60 µm.

9. The disk drive unit as claimed in claim 7, wherein the second dimple has a soft top portion for absorbing shocking or vibration.

10. The disk drive unit as claimed in claim 7, wherein an actuator mounting datum hole is formed in the notch of the micro-actuator at a position corresponding to the second dimple; and a flexure mounting datum hole is formed in the slot of the flexure corresponding to the second dimple; the second dimple extends through the flexure mounting datum hole and the actuator mounting datum hole in sequence when assembling the micro-actuator, the flexure and the load beam together so as to ensure a high assembly precision.

11. The disk drive unit as claimed in claim 7, wherein the thin film PZT pieces are coupled to the flexure with anisotropic conductive film.

12. The disk drive unit as claimed in claim 7, wherein each of the thin film PZT pieces comprises an electric layer, an insulated layer, and a PZT layer sandwiched between the electric layer and the insulated layer; the micro-actuator is mounted on the flexure with the electric layer facing to the flexure.

* * * * *